United States Patent
Desir, Sr.

[11] Patent Number: 5,311,711
[45] Date of Patent: May 17, 1994

[54] J-TYPE WINDOW LACE ASSEMBLIES

[75] Inventor: Julio Desir, Sr., Inkster, Mich.

[73] Assignee: Standard Products Company, Cleveland, Ohio

[21] Appl. No.: 968,858

[22] Filed: Oct. 30, 1992

[51] Int. Cl.⁵ .............................................. E06B 3/62
[52] U.S. Cl. ...................................... 52/208; 428/122; 428/358; 52/716.5; 52/393; 49/490.1; 296/93
[58] Field of Search ...................... 296/93; 52/393, 712, 52/208, 400, 716.5; 428/122, 358; 49/490

[56] References Cited

U.S. PATENT DOCUMENTS

| | | |
|---|---|---|
| 1,214,057 | 3/1968 | Taplin . |
| 4,248,933 | 2/1981 | Katoh . |
| 4,358,917 | 11/1982 | Oda .................... 52/716.5 |
| 4,546,986 | 10/1985 | Roselli . |
| 4,708,895 | 11/1987 | Mizusawa . |
| 4,765,673 | 8/1988 | Frabotta ................. 296/93 |
| 4,813,733 | 3/1989 | Gustafson et al. . |
| 4,833,847 | 5/1989 | Inayama ............ 296/93 X |
| 4,880,674 | 11/1989 | Shimizu . |
| 4,884,380 | 12/1989 | Yada .................. 296/93 X |
| 4,890,431 | 1/1990 | Katayama ........... 52/400 X |
| 4,905,432 | 3/1990 | Romie ................ 52/400 X |
| 4,929,481 | 5/1990 | Iwasa . |
| 4,929,490 | 5/1990 | Iwasa . |
| 4,950,019 | 8/1990 | Gross ...................... 296/93 |
| 4,953,907 | 9/1990 | Sugita ..................... 296/93 |
| 4,974,901 | 12/1990 | Katayama .......... 52/716.5 X |
| 4,984,839 | 1/1991 | Miyakawa .......... 52/400 X |
| 5,001,876 | 3/1991 | Harper ............... 296/93 X |
| 5,032,444 | 7/1991 | Desir, Sr. . |
| 5,039,157 | 8/1991 | Yada ...................... 296/93 |
| 5,193,875 | 3/1993 | Tamura ............... 52/400 X |

OTHER PUBLICATIONS

British Specification 754,311.

Primary Examiner—Carl D. Friedman
Assistant Examiner—Beth A. Aubrey
Attorney, Agent, or Firm—Harness, Dickey & Pierce

[57] ABSTRACT

A glass reveal molding having a generally J-shaped clamping portion which exerts substantially even gripping pressures on both the top and bottom surfaces of the glass panel is disclosed. The molding includes a relatively rigid clamping portion and a more flexible crown portion. The crown may be provided with a high gloss finish. The molding substantially eliminates rollover or disengagement of the molding from the glass prior to complete assembly. The molding also provides a crown which covers the gap between the vehicle body and the glass panel. Also disclosed are various methods of producing the glass reveal molding.

9 Claims, 2 Drawing Sheets

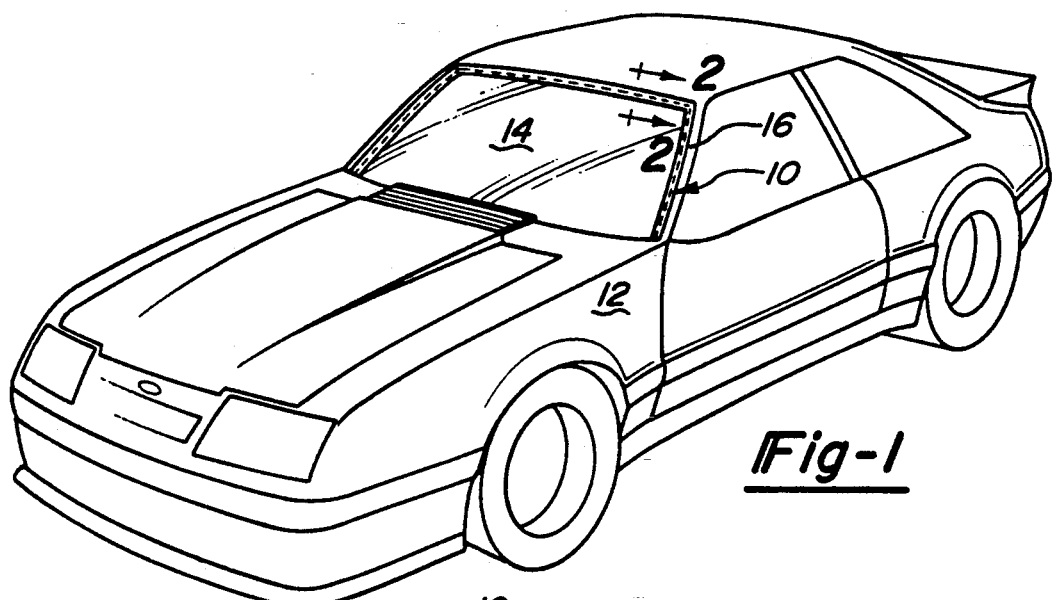
Fig-1
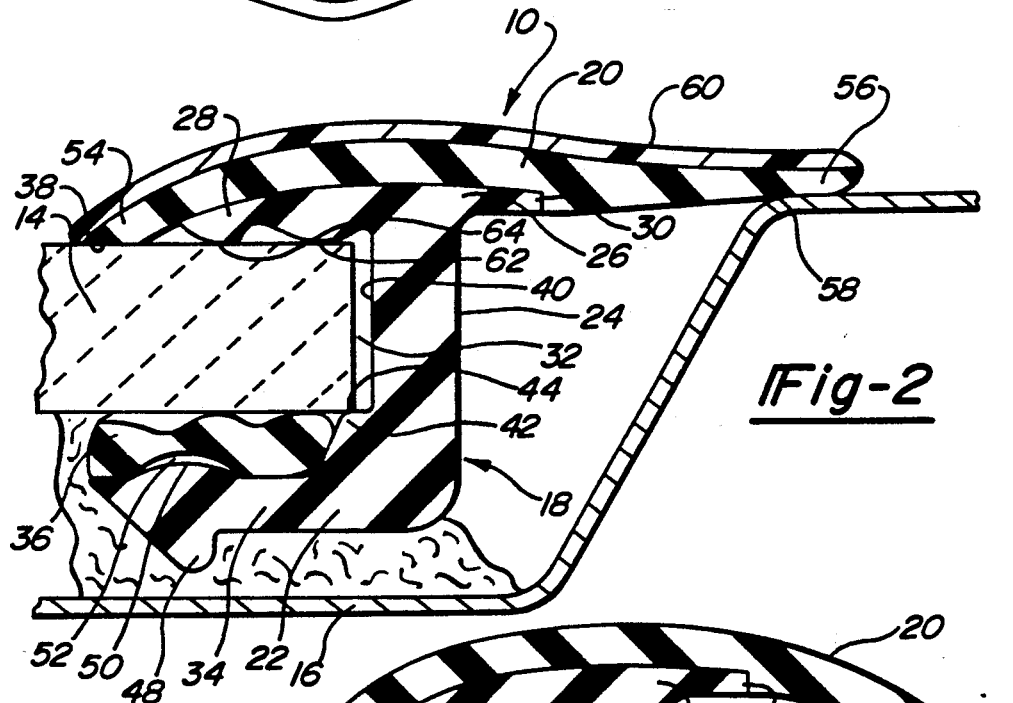
Fig-2
Fig-3

J-TYPE WINDOW LACE ASSEMBLIES

BACKGROUND OF THE INVENTION

The present invention relates generally to edge molding for window panels or the like. More particularly, the present invention relates to a molding for a fixed window of an automotive vehicle such as a windshield or rear window and the processes for forming the same. The molding serves to bridge the space located between the edge of the glass panel and the adjacent body panel.

Automotive windshields and rear windows are commonly mounted to the associated vehicle body in a manner which leaves a space between the periphery of the glass panel and the body panel. This space is covered by a molding often referred in the industry as a windshield or rear window reveal molding. In covering the space between the glass panel and the vehicle body, the J-shaped molding serves to improve the visual appearance of the automotive vehicle and to reduce wind noise.

To present the best visual appearance, reveal moldings must extend evenly around the space between the glass panel and the body panel and must be able to accommodate space having varying widths. Reveal moldings should also be able to curve around the radius of the glass panel without detaching from the edge of the panel or twisting to become disengaged from the glass panel or body panel. Reveal moldings should also resist the attachment forces subjected by wind, rain, snow and artificial elements such as automated, automotive car washing mechanisms.

Many moldings designed for attachment to the edge of automobile windshields and rear windows are of a single, asymmetrical construction. When such moldings are attached around the radius of a glass panel edge the clamping pressure of the two opposing molding surfaces is uneven due to the difference of resistance between the mass of material above and below the center axis of glass. This difference in resistance can cause gaping of one gripper or the other resulting in a loss of uniform gripping about the radius. Loss of gripping can result in detachment of the molding from the glass edge and a rolling of the molding away from the surface of the glass or from the surface of the vehicle body. This result is unsightly and defeats the cosmetic function of the molding as well as increasing the possibility of the molding becoming snagged and pulled out.

Another problem with many of the moldings designed for attachment to the edge of glass panel is that the molding requires an adhesive to ensure a sealing engagement between the window and the molding. Additionally, the mold assemblies heretofore utilized typically are formed of a ridged rubber compound or plastic which make the molding highly inflexible.

Two patents which overcome some of the above shortcomings are U.S. Pat. Nos. 4,813,733 and 5,032,444, assigned to the Assignee of the present application, the specifications of which are herein incorporated by reference. These devices function satisfactorily; however, designers strive to improve upon the art.

In accordance with the present invention, a glass reveal molding having a generally J-shaped clamping portion which exerts substantially even gripping pressure on both the top and bottom surfaces of the glass panel is disclosed. The closing pressure of the clamping portion will substantially eliminate gaping around the radius and retains the molding on the windshield without gaping or rolling of the molding. The molding also has a crown which covers the head of the J clamping portion. The crown enables the molding to cover the gap between the windshield and the body panel. Further, the molding provides an excellent grip to a glass surface without the need for utilizing an adhesive. The molding can be provided with a high gloss coating to improve the moldings appearance.

A further understanding of the present invention will be had from the following description of the preferred embodiments taken in conjunction with the attached drawings and claims.

BRIEF DESCRIPTION OF THE DRAWINGS

FIG. 1 is a perspective view illustrating a reveal molding of the present invention in place about the periphery of a windshield of an automotive vehicle.

FIG. 2 is a cross-sectional view demonstrating a first reveal molding embodiment according to the teachings of the present invention.

FIG. 3 is a cross-sectional view of a second reveal molding embodiment according to the teachings of the present invention.

DETAILED DESCRIPTION OF THE PREFERRED EMBODIMENT

Figure 4:
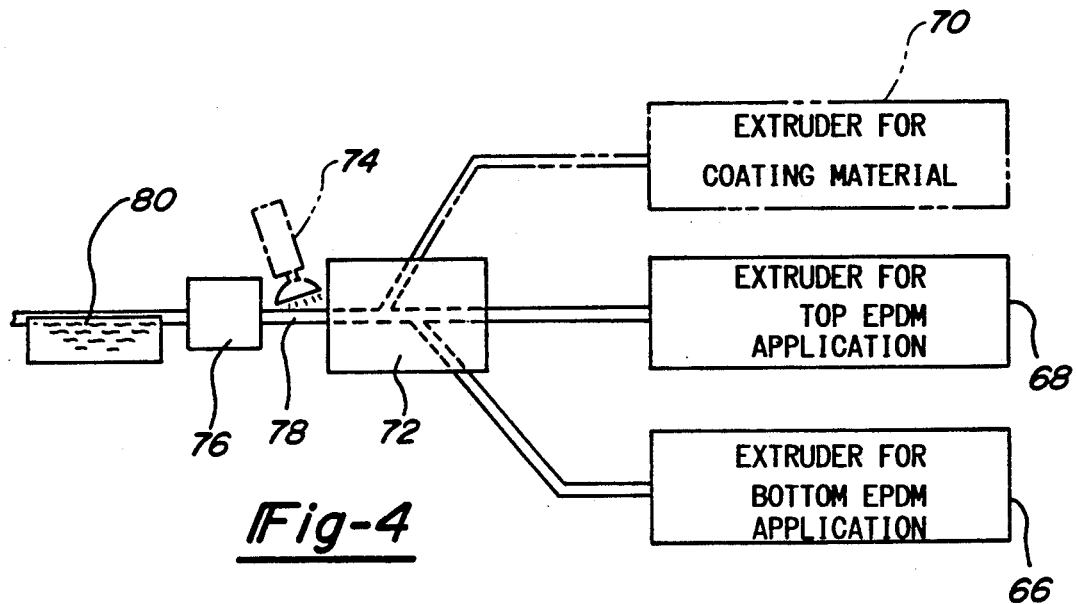
FIG. 4 demonstrates a first method for producing a J-shaped reveal molding according to the present invention.

Referring to FIGS. 1, 2 and 3, preferred embodiments of a hug on glass molding of the present invention are illustrated. FIG. 1 illustrates a hug on glass molding 10 in operative association with an automotive glass panel such as a windshield reveal molding. The hug on glass molding 1 0 extends around the sides and top of a windshield 14 to cover the space between a conventionally installed windshield glass panel 14 and a body panel 16 of the automobile 12. It will, of course, be appreciated by those skilled in the art that hug on glass molding 10 is well suited for use as an automotive windshield reveal molding or rear window reveal molding, but also has molding uses both inside and outside the automotive field.

Referring specifically to FIGS. 2 and 3 a hug on glass molding 10 is comprised of a suitable elastic material and is an elongated molding broadly comprising, in cross-section, a J-shaped clamping portion 18 and a crown 20. The J-shaped clamping portion 18 includes a leg 22, body 24, and head 26. The head 26 is divided into a front half 28 and a rear half 30 by the body 24 with the rear half 30 being longer than the front half 28. The leg 22, body 24 and front half 28 of head 26 form a channel 32 which receives the glass panel 14. The leg 22, includes a first portion 34 disposed substantially transverse to the body 24 and a second portion 36 extending from the first portion 34 which projects into the channel 32. Head front half 28 and rear half 30, in a relaxed position, both arcuately extend from the body 24. The head front half 28 has its free end 38 extending inwardly into the channel 32. The leg 22 extends a distance from the surface 40 which is ordinarily greater than the width of the glass panel 14. This length may be as little as 0.5 millimeters longer than the specified glass thickness to prevent roll over of the molding. The body 24 has a substantially planer interior surface 40 and a projecting portion 42 which provides a shelf 44 for hosting the edge of glass panel 14.

The leg 22 further includes a nib 48 which comes to rest upon or is in close approximation to the vehicle body 16. The nib 48 enables an adhesive to flow around the nib to mechanically lock the hug on glass molding 10 in place with respect to the vehicle body when the adhesive hardens. The first portion 34 of leg 22 also includes an arcuate portion 50 extending in the direction of channel 32. The second portion 36 of leg 22 includes a recess 52 which meets with the arcuate portion 50 upon compression of the second portion into the first portion during insertion of the glass panel 14 into channel 32.

The crown 20 provides an umbrella shaped cover which extends across the space between the windshield glass panel 14 and the adjacent vehicle body 16. The crown 20 is resilient and flexible so as to maintain engagement over the associated vehicle body which may not always be in exact alignment. The crown 20 includes a lead portion 54 and a tail portion 56 wherein the lead portion 54 covers the head front half 28 of the J-shaped clamping portion 18. The head front half 28 is provided with an arcuate projection 62 and a nib 64 which are in contact with the glass panel 14 upon full insert of the glass panel into channel 32. Optionally, the crown portion 20 can be provided with a high gloss coating 60.

The lead portion 54 along with the head front half 28 is of a substantially equal amount of mass as the leg 22 so that an equal amount of mass is above and below the central plane of the glass panel 14. This allows for even clamping pressure on the opposite surfaces of the glass portion. This equalized pressure of force of the clamping member reduces the problem of gaping and twisting around the radius of the windshield and enhances retention of the molding on the windshield without rolling or gaping of the molding. Thus, problems with respect to the attachment of the molding from the glass edge or a rolling of the molding away from the glass edge are minimized.

The tail 56 is substantially flexible to contact the vehicle body 16. The flexibility is controlled by the extension of the tail 56 beyond the sealing point 58 of the tail 56 with the head rear half 30. When the reveal hug on molding 10 is installed, as seen in FIG. 2, the head rear half 30 and tail 56 are substantially straightened and extended from their relaxed arcuate position. Due to the desire of the more ridged straightened head rear half 30 to return to its relaxed arcuate position, the head rear half 30 generates a downward force in the head rear half 30 to pull the tail 56 downward which, in turn, causes the tail 56 to engage in sealing contact with the vehicle body 16. The hug on molding 10 is well adapted to be a windshield reveal molding and can accommodate uneven edges of glass without becoming twisted or otherwise disengaged.

Figure 5:
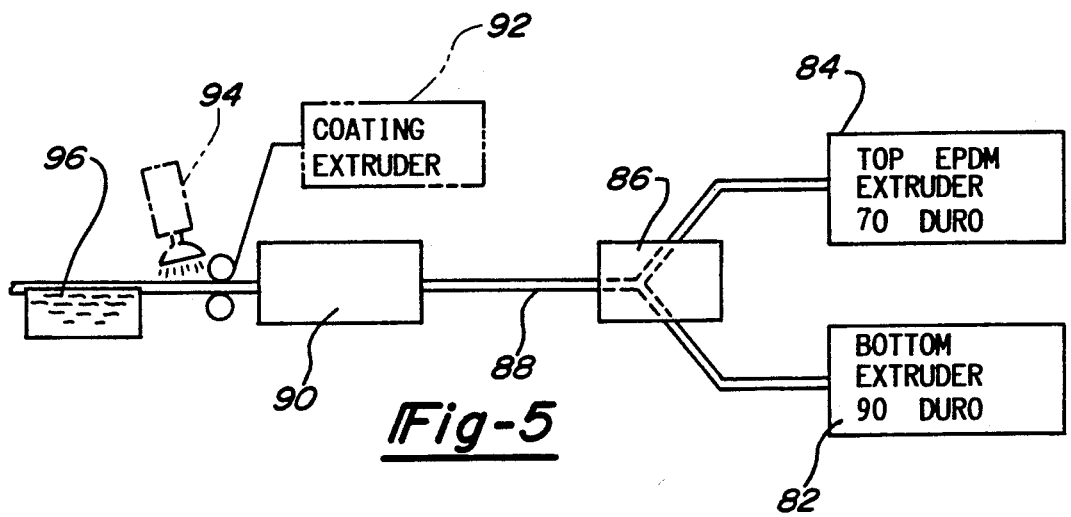
FIG. 5 demonstrates a second method for producing a J-shaped reveal molding according to the present invention.

The J-shaped reveal molding 10 can be produced as demonstrated in FIGS. 4 and 5. With specific reference to FIG. 4 initially an amount of 90A-durometer EPDM rubber is extruded by a first extruder 66 to a die 72. The 90A-durometer EPDM rubber is extruded at a temperature of between approximately 180° F. to about 200° F. Simultaneously, 70A-durometer EPDM rubber is extruded from a second extruder 68 to the die 72 at a temperature of between approximately 180° F. to 200° F. to form an extrudate having the overall J-shape, in cross-section. in a preferred embodiment, a coating material is extruded by a third extruder, shown in phantom as 70 at a temperature of between approximately 400°–450° F. to the die 72 to provide the crown portion with a high gloss finish. The die 72 includes a chamber (not shown) which forms the extrusion 78 having an overall J-shape, in cross-section. The die is constructed such that the J-shaped extrudate 78 includes the leg portion 22 which is formed of 90A-durometer EPDM rubber with the crown 20 and second leg portion 36 being formed of the 70A-durometer EPDM rubber. The coating layer 60 which consists of high density polyethylene is disposed over the crown portion 20. As the J-shaped extrudate 78 exits the die 72 heat is applied to the extrudate by a heating source 74 shown in phantom to enhance crystallization of the coating layer 60. The heat supplied by heat source 74 may be in the form of infra-red or convection heat. The J-shaped extrusion is then passed through an air circulated oven 76 which has been preheated to a temperature of between approximately 450° F. to 490° F. for two to three minutes, and preferably for about 2.5 minutes to cure the extrusion. After passing through the oven 76 the J-shaped extrusion is allowed to cool at room temperature or by chilling the extrudate 78 over a cool water tank shown in phantom as 80 wherein upon cooling the J-shaped reveal molding 10 of FIG. 2 is formed. The high density polyethylene coating imparts a high gloss finish level of between 60 to about 80 gloss based on measurements taken according to the test set forth in ASTM 523 Volume 08.01, Pgs. 123-127 (1992), using a 60° measurement geometry. It will be understood that the J-shaped extrudate can also be formed without the coating layer 60 according to the teachings of the process if desired to give a J-shaped reveal molding as shown in FIG. 3.

With reference to FIG. 5, the J-shaped reveal molding 10 can be produced by extruding an amount of 90A-durometer EPDM rubber by a first extruder 82 to die 86. The 90A- durometer EPDM rubber is extruded at a temperature of between approximately 180° F. to 200° F. Substantially simultaneously, 70A-durometer EPDM rubber is extruded from a second extruder 84 to the die 86 at a temperature of between approximately 180° F. to about 200° F. to form and extrudate 88. The die 86 includes a chamber (not shown) which provides the extrudate 88 with an overall J-shape in cross-section. The extrudate 88 is formed such that the body, head and first leg portions are formed of 90A-durometer EPDM rubber with the crown 20 and second leg portion 36 being formed of 70A-durometer EPDM rubber. The extrudate 88 is then passed through an air circulated oven 90 which has been preheated to a temperature of between approximately 450° F. to about 490° F. for two to three minutes, and preferably for about 2.5 minutes to cure the extrudate 88. The extrudate can now be cooled to provide the J-shaped molding as shown in FIG. 3.

Optionally, the extrudate 88 can be coated with a high density polyethylene to supply the molding with additional glossiness. The extrudate 88, while still warm from the oven 90 is coated with the high density polyethylene by a coating extruder 92 and heated by a heat source 94 shown in phantom to enhance crystallization of the coating layer. Again, the extrudate is allowed to cool at room temperature or by chilling the extrudate 86 over a cool water tank shown in phantom as 96, wherein upon cooling the J-shaped reveal molding 10 of FIG. 2 is formed. The coating 60 has a high gloss finish level of between about 60 to about 80 gloss based on the aforementioned test.

While the above detailed description describes the preferred embodiment of the present invention, it will be understood that the present invention is susceptible to modifications, variations and alterations without deviating from the scope and spirit of the subjoined claims.

What is claimed is:

1. A molding comprising:
   a clamping member having an overall "J" shape in cross section including a leg, body and head, said leg including a first portion which extends from said body and a second portion which extends from said first leg portion, said head being divided by said body into front and rear halves such that said first leg portion, body and front half of said head define a channel for receiving a panel edge, said first leg portion extending substantially perpendicular to said body and said second leg portion extending from said first leg portion into said channel for securing the panel; and
   a crown coupled with said head and extending beyond said head front and rear halves wherein said clamping member and crown are unitarily formed and said first leg portion, body and head are formed of a material more rigid than said second leg portion and crown.

2. The molding according to claim 1 wherein said head front half arcuately extends from said body towards said leg.

3. The molding according to claim 1 wherein said leg extends a longer distance away from said body than head front half.

4. The molding according to claim 1 wherein said leg is longer than a distance between said head front half and said leg.

5. The molding according to claim 1 wherein said crown is provided with a high gloss finish layer.

6. The molding according to claim 5 wherein said high gloss finish layer is high density polyethylene.

7. The molding according to claim 1 wherein said head includes a nib and arcuate projection extending into said channel for securing said panel.

8. The molding according to claim 1 wherein said body is provided with a projection extending into said channel, said projection including a shelf for hosting said panel.

9. The molding according to claim 1 wherein said first leg portion, body and head are formed from 90A-durometer EPDM rubber and said second leg portion and crown are formed from 70A-durometer EPDM rubber.

* * * * *